(No Model.)
D. ROBERTS.
RUBBER WATER BAG FOR MEDICAL TREATMENT.
No. 329,955. Patented Nov 10, 1885.
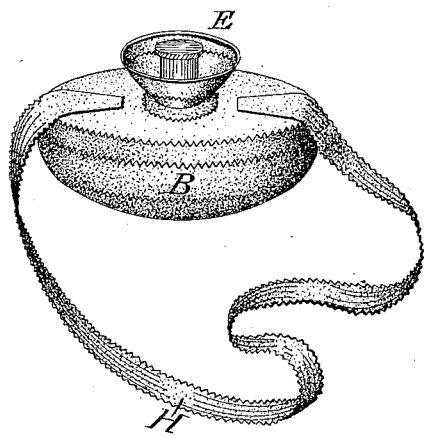
ATTEST:
INVENTOR:
D. Roberts,
by his attorney,
Edward P. Thompson

UNITED STATES PATENT OFFICE.

DWIGHT ROBERTS, OF NEW YORK, N. Y.

RUBBER WATER-BAG FOR MEDICAL TREATMENT.

SPECIFICATION forming part of Letters Patent No. 329,955, dated November 10, 1885.

Application filed January 17, 1885. Serial No. 153,198. (No model.)

*To all whom it may concern:*

Be it known that I, DWIGHT ROBERTS, residing at New York, in the county of New York and State of New York, have invented a new and useful Rubber Water-Bag, of which the following is a description.

My invention relates to the construction of rubber water-bags for application to the person for curing nasal catarrh, &c.
The apparatus is described by reference to the accompanying drawing, which shows a perspective view of the complete device.

B represents a rubber bag provided with a funnel-opening, E, and a screw-cap, as shown, which is for the purpose of closing the opening. The bag is furnished also with a rubber band or strap, H, in a single piece, and integral with the bag.

I am aware that apparatus has already been invented for curing catarrh, and that it is old to provide means for securing rubber bags having openings adapted to be closed by screw-caps to the body; but I am not aware of any bag that has yet been constructed so that it may at once be applied to the nose or forehead and fit the same properly, and be secured thereto by simply slipping a single elastic band over the head.

What I claim, and desire to secure by Letters Patent, is—

A rubber bag furnished with funnel-opening and screw-cap adapted for use upon the nose and forehead, and furnished with a rubber strap or band in a single piece and integral therewith, substantially as and for the purpose specified.

DWIGHT ROBERTS.

Witnesses:
 ALEX. D. BAILIE,
 EDWARD P. THOMPSON.